(12) United States Patent
Lee et al.

(10) Patent No.: US 10,255,844 B2
(45) Date of Patent: Apr. 9, 2019

(54) HEAD MOUNTED DISPLAY DEVICE AND METHOD OF DRIVING THE SAME

(71) Applicant: SAMSUNG DISPLAY CO., LTD., Yongin-si, Gyeonggi-do (KR)

(72) Inventors: Min-Tak Lee, Hwaseong-si (KR); Si-Beak Pyo, Cheonan-si (KR); Kyu-Seok Kim, Asan-si (KR); Young-Nam Yun, Suwon-si (KR); Hyun-Koo Lee, Seoul (KR); Young-Sik Lim, Cheonan-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 257 days.

(21) Appl. No.: 15/403,469

(22) Filed: Jan. 11, 2017

(65) Prior Publication Data

US 2018/0005563 A1    Jan. 4, 2018

(30) Foreign Application Priority Data

Jun. 30, 2016  (KR) .................. 10-2016-0082649

(51) Int. Cl.
*G09G 3/20* (2006.01)
*G02B 5/08* (2006.01)
*G09G 3/00* (2006.01)
*G02B 27/01* (2006.01)

(52) U.S. Cl.
CPC ............ *G09G 3/2092* (2013.01); *G02B 5/08* (2013.01); *G02B 27/0172* (2013.01); *G09G 3/002* (2013.01); *G09G 3/003* (2013.01); *G09G 3/2003* (2013.01); *G02B 2027/014* (2013.01); *G02B 2027/0118* (2013.01); *G02B 2027/0132* (2013.01); *G02B 2027/0147* (2013.01); *G09G 2300/02* (2013.01); *G09G 2300/0456* (2013.01); *G09G 2310/0278* (2013.01); *G09G 2310/08* (2013.01); *G09G 2340/0407* (2013.01); *G09G 2340/0457* (2013.01); *G09G 2380/02* (2013.01)

(58) Field of Classification Search
CPC .............. G09G 3/2003; G09G 3/2092; G09G 2340/0407; G09G 2310/0278
See application file for complete search history.

(56) References Cited

U.S. PATENT DOCUMENTS

| | | | |
|---|---|---|---|
| 2008/0106489 A1* | 5/2008 | Brown ............... | G02B 27/0172 345/9 |
| 2014/0327604 A1* | 11/2014 | Oyama ............. | G02B 27/0068 345/8 |
| 2017/0059869 A1* | 3/2017 | Lee ........................ | G02C 11/10 |

FOREIGN PATENT DOCUMENTS

| | | |
|---|---|---|
| JP | 06-138432 A | 5/1994 |
| KR | 2000-0065735 A | 11/2000 |

* cited by examiner

*Primary Examiner* — Abbas Abdulselam
(74) *Attorney, Agent, or Firm* — Lee & Morse, P.C.

(57) ABSTRACT

A head mounted display device includes a display panel including a first display region and a second display region which is arranged at a first angle with respect to the first display region; a reflective panel arranged at a second angle with respect to the second display region, to output a first transmitted light by transmitting a first light which is output from the first display region, and to output a second reflected light by reflecting a second light output from the second display region; and a lens to collect the first transmitted light and the second reflected light.

20 Claims, 11 Drawing Sheets

| R | | | | G | | | | B | | |
|---|---|---|---|---|---|---|---|---|---|---|
| 0 | 1/4 | 0 | | 0 | 0 | 0 | | 0 | 1/4 | 0 |
| 0 | 1/4 | 1/4 | | 0 | 1/2 | 0 | | 0 | 1/4 | 1/4 |
| 0 | 1/4 | 0 | | 0 | 1/2 | 0 | | 0 | 1/4 | 0 |

HEAD MOUNTED DISPLAY DEVICE AND METHOD OF DRIVING THE SAME

CROSS-REFERENCE TO RELATED APPLICATION

Korean Patent Application No. 10-2016-0082649, filed on Jun. 30, 2016, in the Korean Intellectual Property Office, and entitled: "Head Mounted Display Device and Method of Driving the Same," is incorporated by reference herein in its entirety.

BACKGROUND

1. Field

Example embodiments relate to a display device. More particularly, embodiments relate to a head mounted display device and a method of driving a head mounted display device.

2. Description of the Related Art

A head mounted display device (HMD) is mounted on a head, e.g., a head of a user, and enlarges an image (e.g., an image which is output from a display panel) using a lens, and provides the image directly to eyes of a user.

Generally, a pixel density of a display panel (e.g., a display panel having a high resolution) is about 500 pixels per inch (PPI). Typically, a pixel of the display panel is not visible to the user. However, a pixel of a display panel in the head mounted display device is visible to the user, e.g., a screen door effect occurs, because the head mounted display uses the lens.

A thickness of a lens of eyes of the user changes according to a distance of a real object from the user when the user looks at the real object. However, the thickness of the lens of eyes of the user does not change when the user looks at an object displayed by the head mounted display device, because a distance between the display panel in the head mounted display device and eyes of the user is constant. This results in fatigue of the user, e.g., a motion sickness is caused to the user.

SUMMARY

According to example embodiments, a head mounted display device may include a display panel including a first display region and a second display region which is arranged with a first angle with respect to the first display region; a reflective panel arranged with a second angle with respect to the second display region, configured to output a first transmitted light by transmitting a first light which is output from the first display region, and configured to output a second reflected light by reflecting a second light which is output from the second display region; and a lens configured to collect the first transmitted light and the second reflected light.

In example embodiments, the first angle may be 90 degrees, and the second angled may be 45 degrees.

In example embodiments, the display panel may be a foldable display panel.

In example embodiments, each of the first display region and the second display region may include pixels which are arranged in a PenTile form.

In example embodiments, the a pixel arrangement of the first display region may be the same as a pixel arrangement of the second display region, and the first transmitted light may be compensated by the second reflected light.

In example embodiments, the each of the first display region and the second display region may include pixels which are arranged in a stripe form.

In example embodiments, the head mounted display device may further include a timing controller to output converted data by processing input image data; a data driver configured to generate a data signal based on the converted data and to provide the data signal to the display panel; and a scan driver configured to provide a scan signal to the display panel.

In example embodiments, the timing controller may divide the input image data into first sub data corresponding to the first display region and second sub data corresponding to the second display region and may generate sub data by inverting the second sub data in a first direction.

In example embodiments, the data driver may sequentially provide the display panel with a first data signal corresponding to the first sub data and a second data signal to the second sub data, and the scan driver may provide the scan signal to the display panel along the first direction.

In example embodiments, the timing controller may divide the input image data into first sub data corresponding to the first display region and second sub data corresponding to the second display region.

In example embodiments, the data driver may provide a first data signal corresponding to the first sub data to the first display region and may provide a second data signal corresponding to the second sub data to the second display region. Here, the scan driver may provide the scan signal to the first display region along the first direction and may provide the scan signal to the second display region along a second direction which is opposite to the first direction.

In example embodiments, the timing controller may respectively render the first sub data and the second sub data using a rendering filter according to a pixel arrangement of the first display region and a pixel arrangement of the second display region.

According to example embodiments, a head mounted display device may include a display panel including a first display region and a second display region which is arranged with a first angle with respect to the first display region; a reflective panel arranged with a second angle with respect to the second display region, configured to output a first transmitted light by transmitting a first light which is output from the first display region, and configured to output a second reflected light by reflecting a second light which is output from the second display region; and a lens configured to collect the first transmitted light and the second reflected light, where a first distance between the first display region through the reflection panel to the lens is different from a second distance between the second display region through the reflection panel to the lens.

In example embodiments, the second distance may be longer than the first distance and may be shorter than a focal length of the lens.

In example embodiments, a resolution of second pixels included in the second display region may be lower than a resolution of first pixels included in the first display region.

In example embodiments, the head mounted display device may further include a timing controller configured to generate first sub data and second sub data by dividing input image data based on a depth of an image corresponding to the input image data; and a data driver configured to generate a first data signal based on the first sub data, to provide the first data signal to the first display region, to generate a second data signal based on the second sub data, and to provide the second data signal to the second display region.

In example embodiments, the timing controller may extract objects from the input image data, may calculate a difference between locations of first objects which correspond each other among the objects, and may determine a depth of the first objects based on the difference.

In example embodiments, the input image data may include left-eye data and right-eye data. Here, the timing controller may extract a first left object by detecting a closed loop in the left-eye data, may extract a first right object by detecting a closed loop in the right-eye data, and may calculate the difference based on a first horizontal location of the first left object and a second horizontal location of the first right object.

In example embodiments, the timing controller may generate the first sub data based on the first objects of the input image data when the depth of the first objects is greater than a reference depth and may generate the second sub data by cutting the first sub data from the input image data.

According to example embodiments, a method of driving a head mounted display device including a lens, a first display region and a second display region which have difference distance from the lens, may include extracting objects from input image data; calculating a difference between locations of first objects which corresponds each other among the objects; determining a depth of the first objects based on the difference; generating first sub data and second sub data by dividing the input image data based on the depth of the first objects; and displaying a first sub image corresponding to the first sub data using the first display region and a second sub image corresponding to the second sub data using the second display region, respectively.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
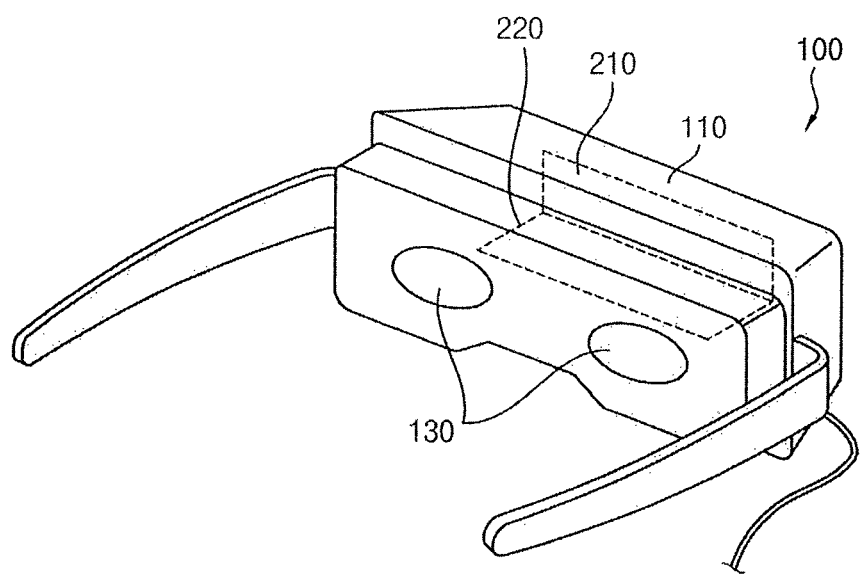
FIG. 1 illustrates a diagram of a head mounted display device according to example embodiments.
Figure 2:
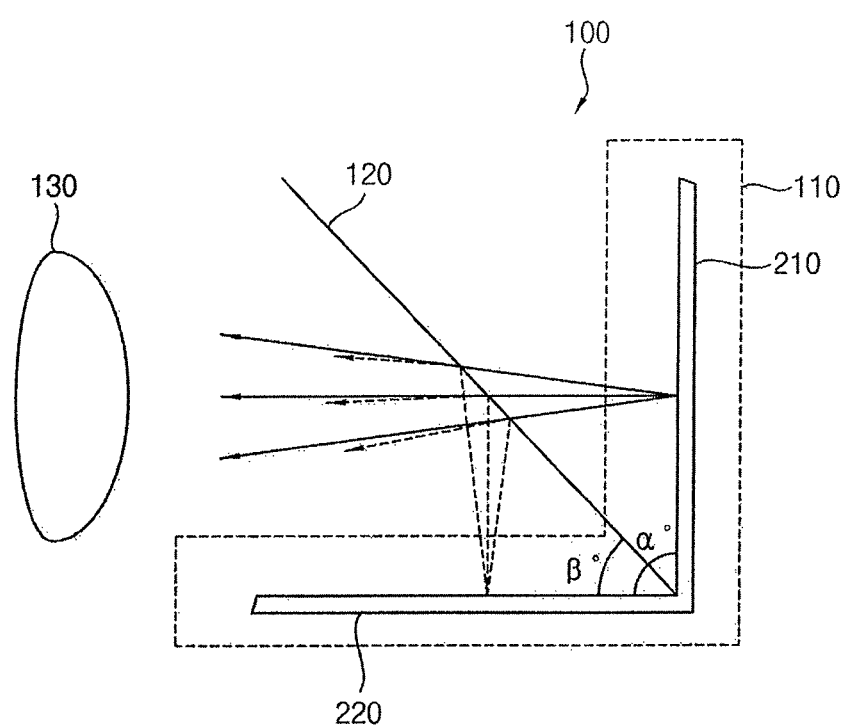
FIG. 2 illustrates a diagram of a cross-section of the head mounted display device of FIG. 1.

FIG. 1 is a diagram illustrating a head mounted display device according to example embodiments. FIG. 2 is a diagram illustrating a cross-section of the head mounted display device of FIG. 1.

Referring to FIGS. 1 and 2, a head mounted display device 100 (or a head mounted display system) may include a display panel 110, a reflective panel 120, e.g., a transparent reflective panel, and a lens 130. The head mounted display device 100 may be mounted on a head of a user and may further include a frame (or a case) which supports the display panel 110 and the lens 130. The display panel 110 may be spaced apart from the lens 130 by a predetermined distance.

The display panel 110 may display an image using pixels. The display panel 110 may include a first display region 210 (or a first display unit, a first sub display panel, etc.) and a second display region 220 (or a second display unit, a second sub display panel, etc.). The second display region 220 may be arranged with a first angle α, e.g., about 90 degrees, with respect to the first display region 210. For example, the first display region 210 may be orthogonal to a visual axis of the user, e.g., parallel to the lens 130 and orthogonal to an optical axis of the lens 130. The second display region 220 may be orthogonal to the first display region 210, e.g., parallel to the visual axis and the optical axis. As illustrated in FIG. 1n FIG. 1, the second display region 220 is located in a down direction with respect to the first display region 210, e.g., extends from the first display region 210 below the lens 130. However, the display panel 110 is not limited thereto. For example, the second display region 220 may be located in an up/left/down direction, etc., relative to the lens 130.

In some example embodiments, the display panel 110 may be a foldable display panel. For example, the first display region 210 and the second display region 220 may have a same pixel arrangement and may be driven by a driving integrated circuit (IC).

The reflective panel 120 may be arranged with a second angle β with respect to the second display region 220, may output a first transmitted light (or a first transmitted image) by transmitting a first light (or a first image) output from the first display region 210, and may output a second reflected light (or a second reflective image) by reflecting a second light (or a second image) output from the second display region 220. The reflective panel 120 may include transparent films which are overlapped each other and which have different refractive indexes. An intensity (or a reflectance, reflectivity) of the first transmitted light may be equal to an intensity of the second reflected light. For example, the reflective panel 120 may be a mirror including a thin layer, e.g., with a thickness in a range of 10 through 20 angstroms (Å), of a metal, e.g., silver, gold, aluminum, chromium, etc., on a surface of a glass.

In some example embodiments, the second angle β may be 45 degrees. For example, the second display region 220 may have a size (or an area) which is equal to a size of the first display region 210, and a reflective surface of the reflective panel 120 may have the second angle β of 45 degrees with respect to a surface of the second display panel 220. Therefore, the second reflected light (or the second reflected image) may overlap the first transmitted light (or, the first transmitted image).

The lens 130 may collect the first transmitted light and the second reflected light. The lens 130 may provide an image displayed by the display panel 110 directly to eyes of the user when the head mounted display device 100 is mounted on the user. For example, the lens 130 may be a convex lens or an eyepiece.

The head mounted display device 100 may further include a lens, a mirror, and other optical elements to form and to control a light path such that an image displayed by the display panel 110 is provided to eyes of the user.

The first transmitted light (or the first transmitted image) and the second reflected light (or the reflected image) may be complementary according to arrangements of the display panel 110 and the reflective panel 120. When the first display region 210 and the second display region 220 include a same pixel arrangement, the first display region 210 and the second display region 220 may have a same black matrix (BM) (e.g., empty spaces in which no light emitting element is located according to a structure of a pixel and in which a line is arranged, or an array form of the empty spaces which are arranged repeatedly in the display panel 110 according to a pixel arrangement). The second reflected light (or the second reflected image) is inverted (or reversed) in a certain direction by the reflective panel 120. Therefore, the second reflected light may compensate the first transmitted light. For example, a black matrix of the second display region 220 may be seen, e.g., viewed by the user, as having an arrangement different from an arrangement of a black matrix of the first display region 210 by the reflective panel 120, such that a black image corresponding to the black matrix of the first display region 210 may be compensated by the second reflected light. Therefore, the black matrix of the first display region 210 may not be seen by the user, and resolution of the head mounted display device 100 may be improved.

Figure 3:
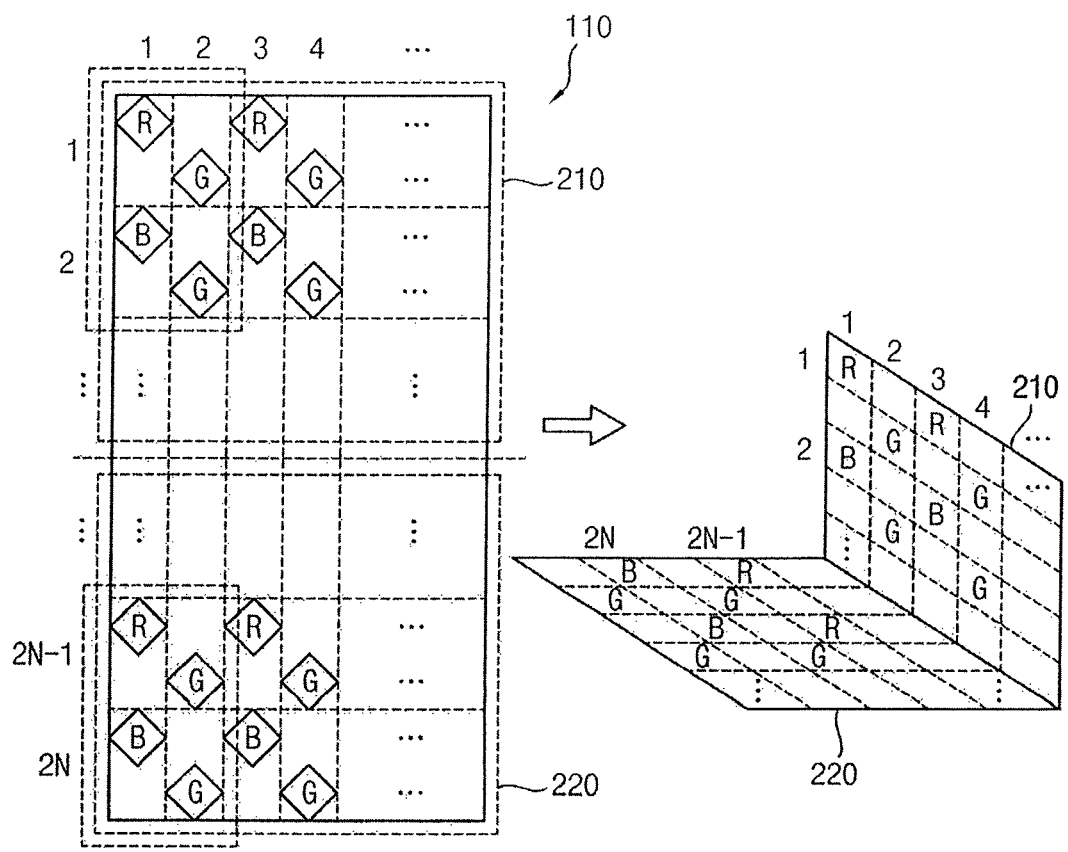
FIG. 3 illustrates a diagram of an example of a display panel included in the head mounted display device of FIG. 1.
Figure 4:
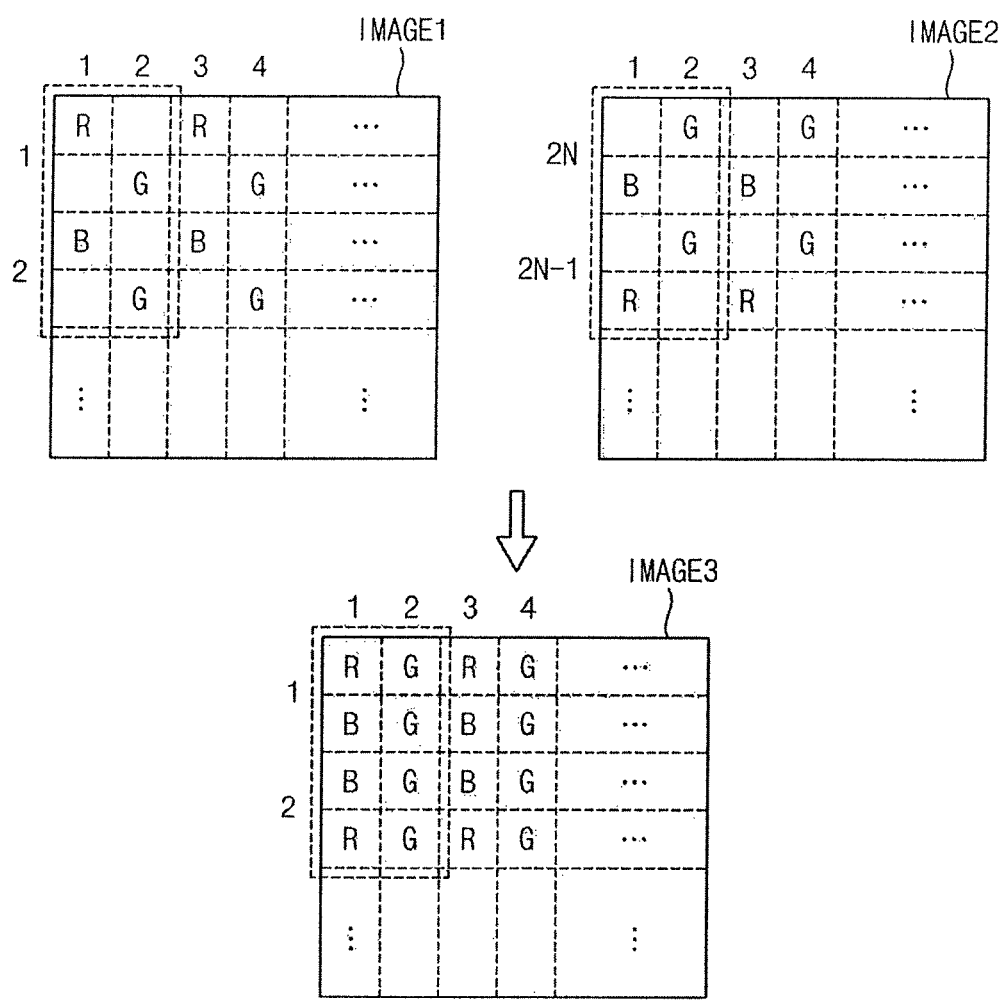
FIG. 4 illustrates a diagram of an example of an image generated by the head mounted display device of FIG. 1.

FIG. 3 is a diagram illustrating an example of a display panel included in the head mounted display device of FIG. 1. FIG. 4 is a diagram illustrating an example of an image generated by the head mounted display device of FIG. 1.

Referring to FIG. 3, the display panel 110 may include pixels which are arranged in a PenTile form, e.g., a PenTile matrix. For example, a first pixel R may be located in a cross-region of an odd-numbered pixel row (e.g., a first pixel row) and an odd-numbered pixel column (e.g., a first pixel column), a third pixel B may be located in a cross-region of an even-numbered pixel row (e.g., a second pixel row) and the odd-numbered pixel column (e.g., a first pixel column), and a second pixel G may be located in an even-numbered pixel column (e.g., a second pixel column) and in all pixel rows. The first pixel R may emit light with a first color (e.g., a red color), the second pixel G may emit light with a second color (e.g., a green color), and the third pixel B may emit light with a third color (e.g., a blue color). The first pixel R and the second pixel G may constitute a first reference pixel, the third pixel B and the second pixel G may constitute a second reference pixel, and the display panel 110 may include repeatedly arranged first and second reference pixels.

According to the PenTile form, a light emitting element of the first pixel R and a light emitting element of the third pixel B may be arranged in an upper portion of a certain pixel row, and a light emitting element of the second pixel G may be arranged in a lower portion of the certain pixel row. Therefore, the display panel 110 may include a black matrix of plaid (or, a checkerboard pattern).

In some example embodiments, the first display region 210 may include first through Nth pixel rows, and the second display region 220 may include N+1th through 2Nth pixel, where N is an integer equal to or greater than 2. The first reference pixel (e.g., the first pixel R and the second pixel G) may be arranged in a 2N−1th pixel row, and the second reference pixel (e.g., the third pixel B and the second pixel G) may be arranged in the 2Nth pixel row. That is, the first display region 210 and the second display region 220 may include the same pixel arrangement.

As described with reference to FIG. 2, the second display region 220 may be arranged with the first angle α (e.g., about 90 degrees) with respect to the first display region 210. A first display image of the first display region 210 may be transmitted through the reflective panel 120, and a second display image of the second display region 220 may be reflected by the reflective panel 120.

Referring to FIG. 4, a first image IMAGE1 may be the first transmitted light (or the first transmitted image) transmitted through the reflective panel 120, and a second image IMAGE2 may be the second reflected light (or the second reflected image) reflected by the reflective panel 120. A third image IMAGE3 may be an image seen by the user and may include the first image IMAGE1 and the second image IMAGE2.

According to the pixel arrangement of the first display region 210, the first image IMAGE1 may include the first color (e.g., a red color) in a cross-region of an odd-numbered pixel row (e.g., a first pixel row) and an odd-numbered pixel column (e.g., a first pixel column, a third pixel column), may include the third color (e.g., a blue color) in a cross-region of an even-numbered pixel row (e.g., a second pixel row) and the odd-numbered pixel column (e.g., a first pixel column, a third pixel column), and may include the second color (e.g., a green color) in an even-numbered pixel column (e.g., a second pixel column, a fourth pixel column). The first image IMAGE1 may sequentially include partial images from the 1$^{st}$ to the Nth pixel row.

According to a reflection of the reflective panel 120, the second image IMAGE2 may sequentially include partial images from a 2Nth pixel row to an N+1th pixel row. Similarly to the first image IMAGE1, the second image IMAGE2 may include the third color in a cross-region of an even-numbered pixel row (e.g., the 2Nth pixel row) and an odd-numbered pixel column (e.g., a first pixel column, a third pixel column), may include the first color in a cross-region of an odd-numbered pixel row (e.g., a 2N−1th pixel row) and the odd-numbered pixel column (e.g., a first pixel column, a third pixel column), and may include the second color (e.g., a green color) in the even-numbered pixel column (e.g., a second pixel column, a fourth pixel column).

According to the first image IMAGE1 and the second image IMAGE2, the third image IMAGE3 may include the first color and the third color in cross-regions of every pixel row (e.g., a first pixel row) and the-odd numbered pixel column (e.g., a first pixel column, a third pixel column) and may include the second color in the even-numbered pixel column (e.g., a second pixel column, a fourth pixel column).

Because a conventional head mounted display device includes only a first display region, e.g., a display panel corresponding to the first display region 210, the first image IMAGE1 is visible to the user. The head mounted display device 100 according to example embodiments may include the first display region 210 and the second display region 220 and may provide the third image IMAGE3 to the user using the reflective panel 120. Therefore, a resolution (or a resolution seen by the user) of the head mounted display device 100 may be improved, and a screen door effect, e.g., where lines separating pixels or subpixels become visible, may be reduced or eliminated.

When the head mounted display device 100 do not use (or include) the reflective panel 120, a pixel arrangement of the second display region 220 may be different from a pixel arrangement of the first display region 210, or the second display region 220 may be misaligned with respect to the first display region 210 for improvement of resolution. However, the head mounted display device 100 may invert (or reverse) only the second image IMAGE2 using the reflective panel 120. Therefore, the head mounted display device 100 may improve resolution using the first and second display regions 210 and 220 having the same pixel arrangement (or using a foldable display panel) without an alignment process.

Figure 5:
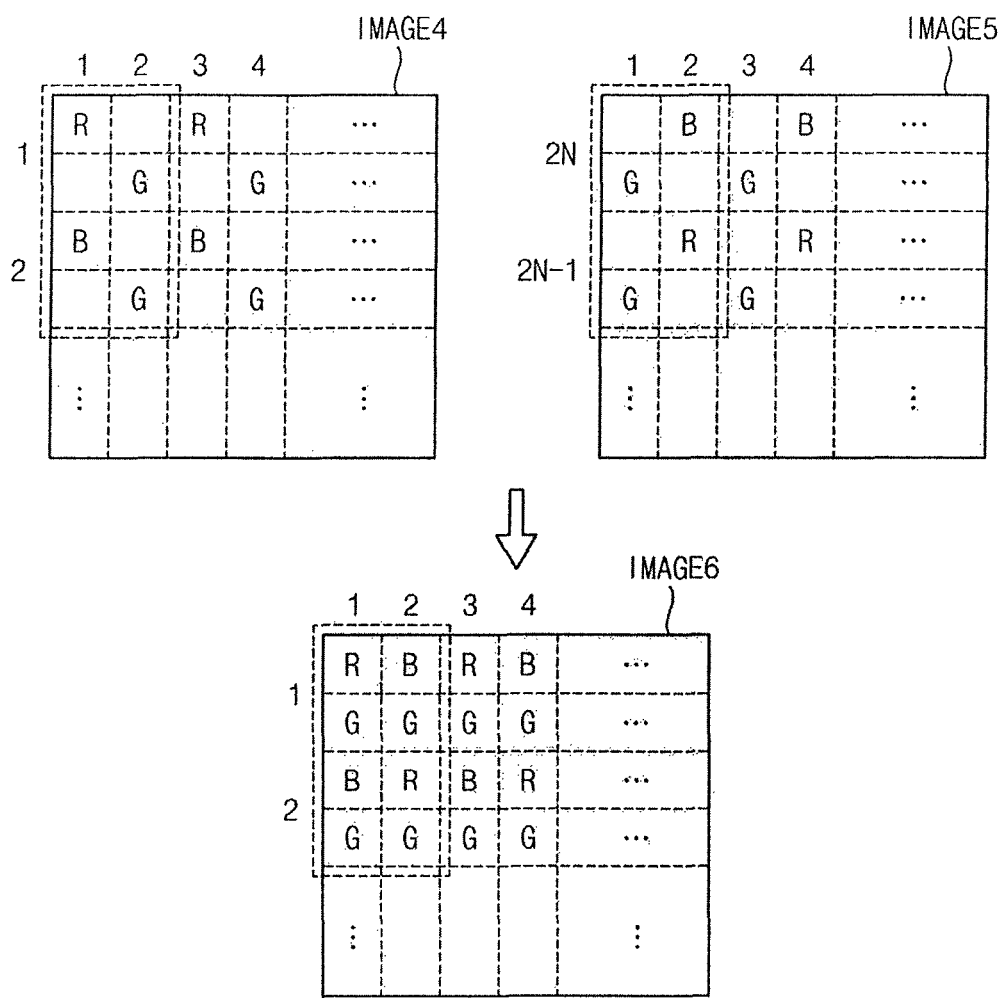
FIG. 5 illustrates a diagram of an example of an image generated by the head mounted display device of FIG. 1.

FIG. 5 is a diagram illustrating an example of an image generated by the head mounted display device of FIG. 1. Referring to FIGS. 1, 2, 4, and 5, a fourth image IMAGE4 may be the first transmitted light (or the first transmitted image) transmitted through the reflective panel 120, and a fifth image IMAGE5 may be the second reflected light (or the second reflected image) which is reflected by the reflective panel 120. The fourth image IMAGE4 may be the same as the first image IMAGE1 described with reference to FIG. 4.

The fifth image IMAGE5 may be different from the second image IMAGE2 described with reference to FIG. 4. For example, the second display region 220 may include pixels which are arranged in a PenTile form, but a second order (or a second arrangement order) of the pixels included in the second display region 220 may be different from a first order (or a first arrangement order) of pixels included in the first display region 210. Here, the second order may correspond to a mirror image of the arrangement for the second display region shown in FIG. 3. That is, the head mounted display device 100 may include the first display region 210 and the second display region 220 (or, two display panels) having different pixel arrangements.

Similarly to the third image IMAGE3 described with reference to FIG. 4, a sixth image IMAGE6 may be an image seen for the user and may include the fourth image IMAGE4 and the fifth image IMAGE5. Therefore, a resolution of the head mounted display device 100 (or, a resolution seen for the user) may be improved, and a screen door effect may be reduced or prevented.

Figure 6:
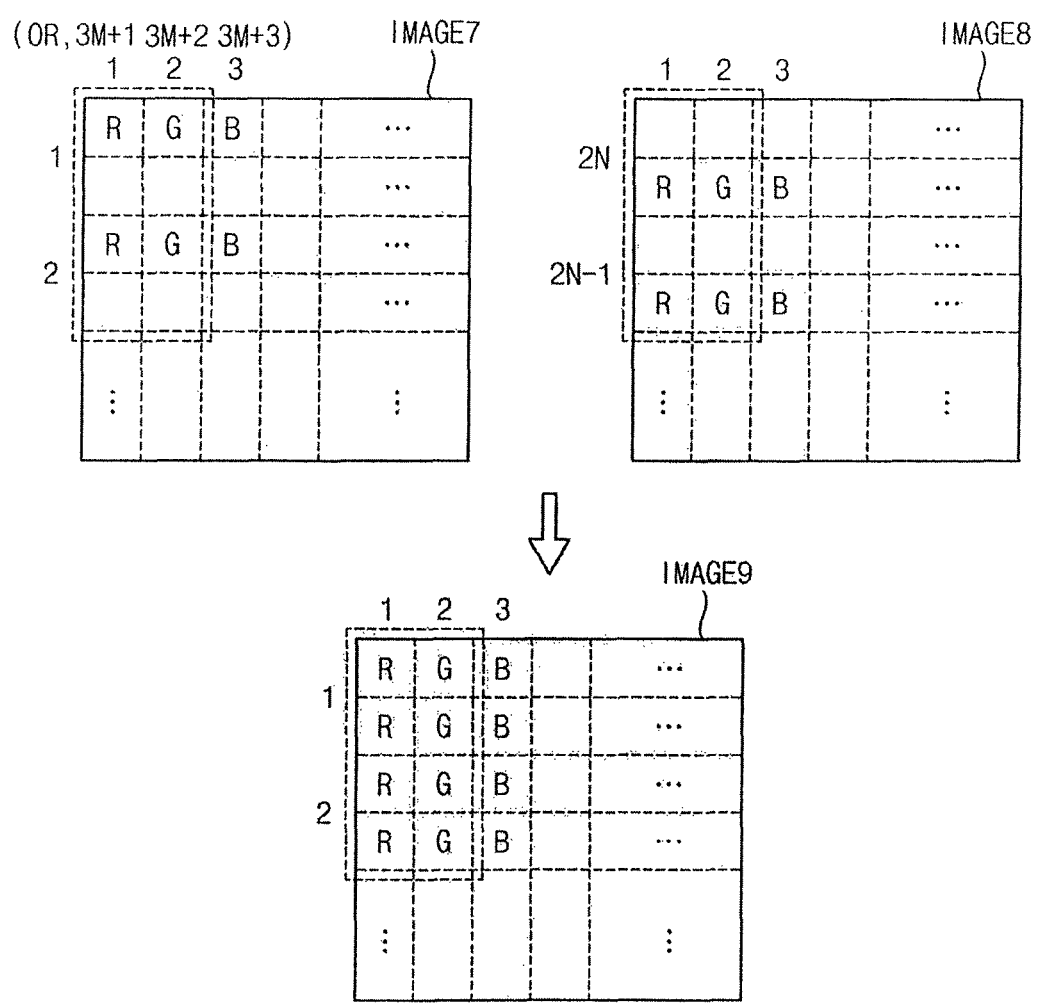
FIG. 6 illustrates a diagram of an example of an image generated by the head mounted display device of FIG. 1.

FIG. 6 is a diagram illustrating an example of an image generated by the head mounted display device of FIG. 1. Referring to FIGS. 1, 2, and 6, the display panel 110 may include pixels arranged in a stripe form. For example, in the first pixel R may be located in a 3M+1th pixel column (e.g., a first pixel column the second pixel G may be located in a 3M+2th pixel column (e.g., a second pixel column), and the third pixel B may be located in a 3M+3th pixel column (e.g., a third pixel column), where M is an integer greater than or equal to 0. The first through third pixels R, G, and B may constitute a third reference pixel, and the third reference pixel may be arranged repeatedly in the display panel 110. Thus, each row includes a repeating pattern of the first through third pixels R, G, and B.

According to the stripe form, a light emitting element of the first pixel R, a light emitting element of the second pixel G, and a light emitting element of the third pixel B may be located in an upper portion of a certain pixel row. Therefore, the display panel 110 may include a black matrix, such as stripes. The display panel 110 is illustrated by way of example in FIG. 6. However, the display panel 110 is not limited thereto. For example, the light emitting element of the first pixel R and the light emitting element of the third pixel B may be located in an upper portion of the certain pixel row, and the light emitting element of the second pixel G may be located in a lower portion of the certain pixel row. Here, the display panel 110 may include a black matrix of plaid (or, a checkerboard pattern).

A seventh image IMAGE7 may be the first transmitted light (or the first transmitted image) which is transmitted through the reflective panel 120, and an eighth image IMAGE8 may be the second reflected light (or the second reflected image) which is reflected by the reflective panel 120.

The seventh image IMAGE7 may include an image (e.g., R, G, and B) arranged in the upper portion of each pixel row corresponding to the third reference pixel. The eight image IMAGE8 may include an image (e.g., R, G, and B) arranged in the lower portion of each pixel row according to a reflection of the reflective panel 120.

Similarly to the third image IMAGE3 described with reference to FIG. 4, a ninth image IMAGE9 may be an image seen for the user and may include the seventh image IMAGE7 and the eighth image IMAGE8. Therefore, a resolution of the head mounted display device 100 (or, a resolution seen for the user) may be improved, and a screen door effect may be reduced or prevented.

Figure 7:
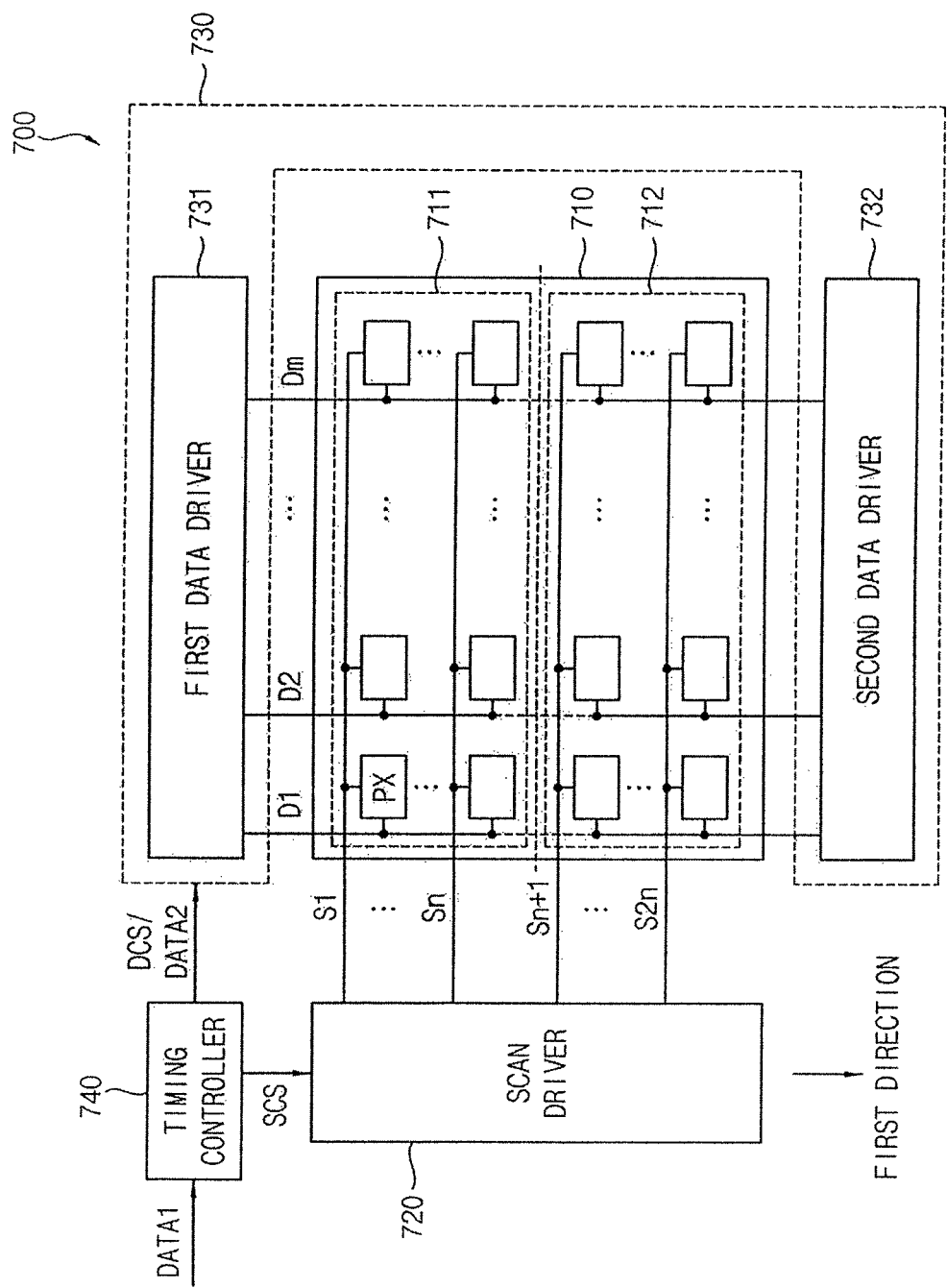
FIG. 7 illustrates a block diagram of an example of the head mounted display device of FIG. 1.
Figure 8:
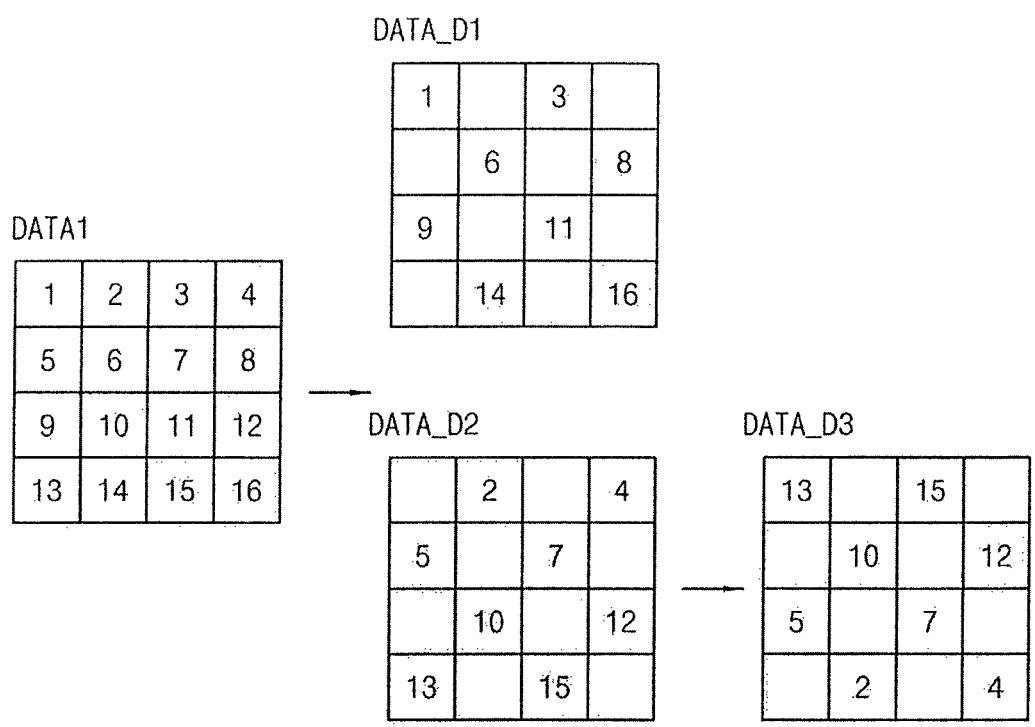
FIG. 8 illustrates a diagram of an example of data generated by a timing controller included in the head mounted display device of FIG. 7.

FIG. 7 is a block diagram illustrating an example of the head mounted display device of FIG. 1. FIG. 8 is a diagram illustrating an example of data generated by a timing controller included in the head mounted display device of FIG. 7.

Referring to FIGS. 1, 2, and 7, a head mounted display device 700 may include a display panel 710, a scan driver 720, a data driver 730, and a timing controller 740. The head mounted display device 700 may display an image based on input image data (e.g., first data DATA1) provided from an external component. For example, the display device 700 may be an organic light emitting display device. The input image data may be three dimensional (3D) image data, for example, the input data may include left image data (or left-eye data) and right image data (or right-eye data) to independently (or respectively) provide the image to eyes of the user.

The display panel 710 may include scan lines S1 through Sn, data lines D1 through Dm, and pixels PX, where each of n and m is an integer greater than or equal to 2. The pixels PX may be disposed in cross-regions of the scan lines S1 through Sn and the data lines D1 through Dm, respectively. Each of the pixels PX may store a data signal (i.e., a data signal provided through the data lines D1 through Dm) in response to a scan signal (i.e., a scan signal provided through the scan lines S1 through Sn), and may emit a light based on a stored data signal.

As described with reference to FIG. 2, the display panel 710 may include a first display region 711 and a second display region 712. For example, the display panel 710 may be a foldable display panel.

The scan driver 720 (or, a gate driver) may generate the scan signal based on the scan driving control signal SCS. The scan driving control signal SCS may be provided from the timing controller 740. The scan driving control signal SCS may include a start signal (or, a start pulse) and clock signals, and the scan driver 720 may include shift registers sequentially generating the gate signal based on the start signal and the clock signals.

The data driver 730 may generate the data signal in response to a data driving control signal DCS. Here, the data driving control signal DCS may be provided from the timing controller 740. The data driver 730 may convert image data in a digital form (e.g., second data DATA2) into a data signal in an analog form. For example, the data driver 730 may generate a digital signal based on grayscale voltages (or, gamma voltages) which are pre-set, where the grayscale voltages may be provided from a gamma circuit to the data driver 730. The data driver 730 may sequentially provide the data signal to the pixels PX.

In some example embodiments, the data driver 730 may include a first data driving unit 731 (or a first sub data driver) and a second data driving unit 732 (or a second sub data driver). Here, each of the data lines D1 through Dm may be opened (or divided) at a boundary between the first display region 711 and the second display region 712. The first data driving unit 731 may provide the data signal to the first display region 711 through upper portions of the first through mth data lines D1 through Dm, and the second data driving unit 732 may provide the data signal to the second display region 712 through lower portions of the first through mth data lines D1 through Dm The timing controller 740 may receive the input image data (e.g., the first data DATA1) and input control signals (e.g., a horizontal synchronization signal, a vertical synchronization signal, and clock signals) from an external component and may generate the converted data (e.g., the second data DATA2) suitable for displaying an image by the display panel 710. The timing controller 740 may control the scan driver 720 and the data driver 730. The timing controller 740 may generate the scan driving control signal SCS and the data driving control signal DCS based on the input control signals.

In some example embodiments, the timing controller 740 may divide the input image data into first sub data and second sub data. Here, the first sub data may correspond to the first display region 711, and the second sub data may correspond to the second display region 712. In addition, the timing controller 740 may generate third sub data by inverting (or reversing) the second sub data in a first direction.

Referring to FIGS. 3 and 8, the input image data DATA1 may include data values corresponding to 4*4 (4 row*4 column) pixels (or reference pixels).

The timing controller 740 may divide the input image data DATA1 into the first sub data DATA_D1 and the second sub data DATA_2 according to the pixel arrangement in the PenTile form described with reference to FIG. 3. The first sub data DATA_D1 may include odd-numbered data values (e.g., a first data value, a third data value, a ninth data value, and an eleventh data value) in odd-numbered rows (e.g., a first row and a third row) and may include even-numbered data values (e.g., a sixth data value, an eighth data value, a fourteenth data value, and a sixteenth data value) in even-numbered rows (e.g., a second row and a fourth row). The second sub data DATA_D2 may include remaining data values of the input image data DATA1 except the first sub data DATA_D1. The second sub data DATA_D2 may include even-numbered data values (e.g., a second data value, a fourth data value, a tenth data value, and a twelfth data value) in odd-numbered rows (e.g., a first row and a third row) and may include odd-numbered data values (e.g., a fifth data value, a seventh data value, a thirteenth data value, and a fifteenth data value) in even-numbered rows (e.g., a second row and a fourth row).

In some example embodiments, the timing controller 740 may provide the first sub data DATA_D1 and the second sub data DATA_D2 to the data driver 730. Here, the data driver 730 may provide the first display region 711 with first data signals corresponding to the first sub data DATA_D1 using the first data driving unit 731 and may provide the second display region 712 with second data signals corresponding to the second sub data DATA_D2 using the second data driving unit 732. The scan driver 720 may sequentially provide the scan signal to the first display region 711 along the first direction and may sequentially provide the scan signal to the second display region 712 along a second direction which is opposite to the first direction. For example, the scan driver 720 may provide scan signal to the first through nth scan lines S1 through Sn along the first direction and may provide scan signal to 2nth through n+1 scan lines S2n through Sn+1 along the second direction. Therefore, the pixels Px included in the first display region 711 may store the data signal, sequentially from a first pixel row to a nth pixel row and may emit light based on the data signal. The pixels Px included in the second display region 712 may store the data signal, sequentially from a 2nth pixel row to a n+1th pixel row (or reverse-sequentially) and may emit light based on the data signal.

In some example embodiments, the timing controller 740 may generate the third sub data DATA_D3 by inverting the second sub data DATA_D2 in the first direction. As illustrated in FIG. 8, the third sub data DATA_D3 may include data values (e.g., a thirteenth data value and a fifteenth data value), which are included in a fourth row of the second sub data DATA_D2, in a first row. Here, the user may see a normal image (e.g., an image not reversed) (or may see an image normally) even though a second image which is output from the second display region 712 is inverted in the first direction by the reflective panel 120 (described with reference to FIG. 2).

In some example embodiments, the timing controller 740 may provide the first sub data DATA_D1 and the third sub data DATA_D3 to the data driver 730. Here, the data driver 730 may sequentially provide the display panel with first data signals corresponding to the first sub data DATA_D1 and third data signals corresponding to the third sub data signal DATA_D3. The scan driver 720 may provide the scan signal to the display panel 710 along the first direction.

For example, the data driver 730 may sequentially provide the first data signals and the third data signals to the display panel 710 (or the first display region 711 and the second display region 712) using on the first data driving unit 731. Here, the scan driver 720 may sequentially provide the scan signal to the first through 2nth scan lines S1 through S2n in the first direction. Therefore, the pixels PX may store the data signals in order from the first pixel row to the 2nth pixel row and may emit light based on the data signals.

As described with reference to FIGS. 7 and 8, the head mounted display device 700 according to example embodiments may divide the input image data DATA1 into the first sub data DATA_D1 corresponding to the first display region 711 and the second sub data DATA_D2 corresponding to the second display region 712 (or the third sub data DATA_D3). Therefore, the head mounted display device 700 may display an image corresponding to the input image data DATA1.

Figures 9, 10:
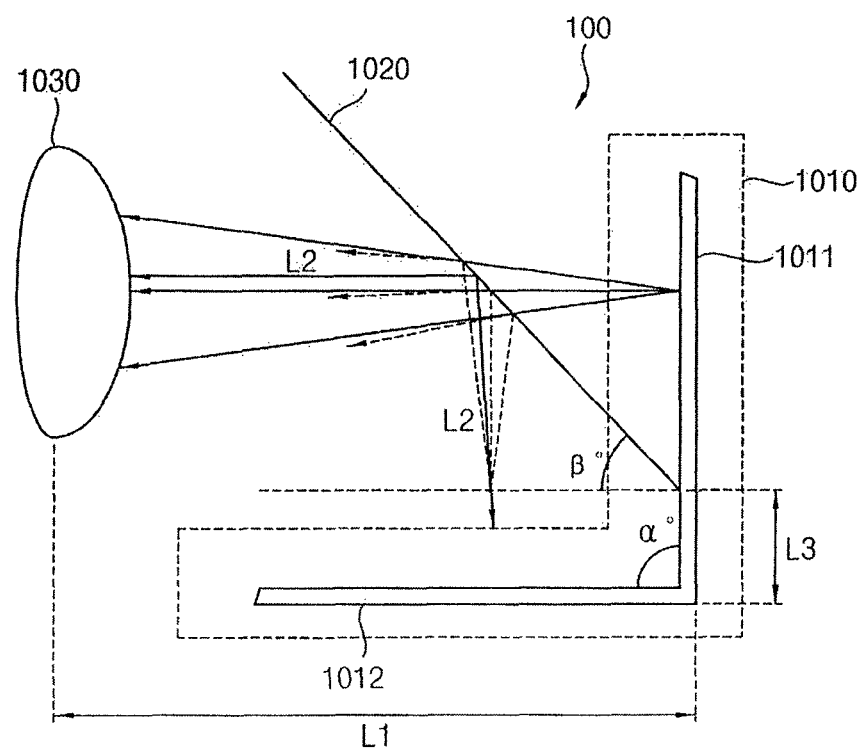
FIG. 9 illustrates a diagram of an example of a rendering filter used in a timing controller included in the head mounted display device of FIG. 7.
FIG. 10 illustrates a diagram of a cross-section of the head mounted display device of FIG. 1.

FIG. 9 is a diagram illustrating an example of a rendering filter used in a timing controller included in the head mounted display device of FIG. 7.

Referring to FIGS. 3, 7, and 9, the first reference pixel may include the first pixel R and the second pixel G, but may not include the third pixel B according to the pixel arrangement in the PenTile form. In addition, a second reference pixel may include the third pixel B and the second pixel G, but may not include the first pixel R. Therefore, the timing controller 740 may render (or perform a sub-pixel rendering) the input image data DATA1 (or the first sub data DATA_D1 and the second sub data DATA_D2) using rendering filers. That is, the timing controller 740 may generate the converted data, which is suitable to the display panel having the pixel arrangement in the PenTile form, using data values corresponding to a certain pixel and an adjacent pixel that is adjacent the certain pixel.

A first rendering filter may be used for the first pixel R and may include an weight of ¼ (i.e., a quarter) for an ijth pixel (e.g., a pixel in an ith pixel row and in a jth pixel column), an weight of ¼ for an i−1jth pixel, an weight of ¼ for an ij+1th pixel, and an weight of ¼ for an i+1jth pixel. The timing controller 740 may calculate a converted data value for the ijth pixel by averaging, e.g., arithmetic averaging, data values corresponding to the ijth pixel and adjacent pixels.

A second rendering filter may be used for the second pixel G and may include an weight of ½ (i.e., an half) for the ijth pixel and an weight of ½ for an i+1 jth pixel. The timing controller 740 may calculate a converted data value for the ijth pixel by averaging (or arithmetic averaging) data values corresponding to the ijth pixel and the i+1jth pixel.

A third rendering filter may be used for the third pixel B and may be the same as the first rendering filter. Therefore, duplicated description will not be repeated.

As described with reference to FIG. 9, the head mounted display device 100 according to example embodiments may render the input image data DATA1 (or the first and second sub data DATA_D1 and DATA_D2) according to the pixel arrangement (e.g., a pixel arrangement in the PenTile form). Therefore, the head mounted display device 100 may improve a quality of an image seen for the user.

The rendering filters are illustrated by way of an example in FIG. 9. The rendering filters are not limited thereto. For example, each of the rendering filters may have weights corresponding to a block of 3*1 (e.g., a block having a size of 3 row*1 column), a block of 2*1, etc., instead of a block of 3*3.

Figure 11:
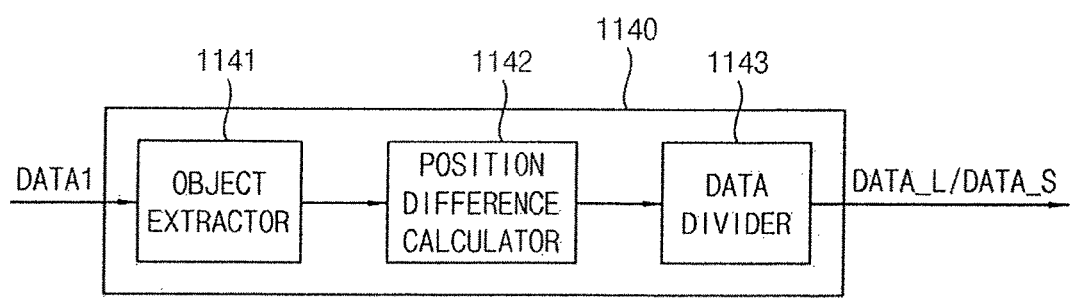
FIG. 11 illustrates a block diagram of an example of a timing controller included in the head mounted display device of FIG. 10.
Figure 12:
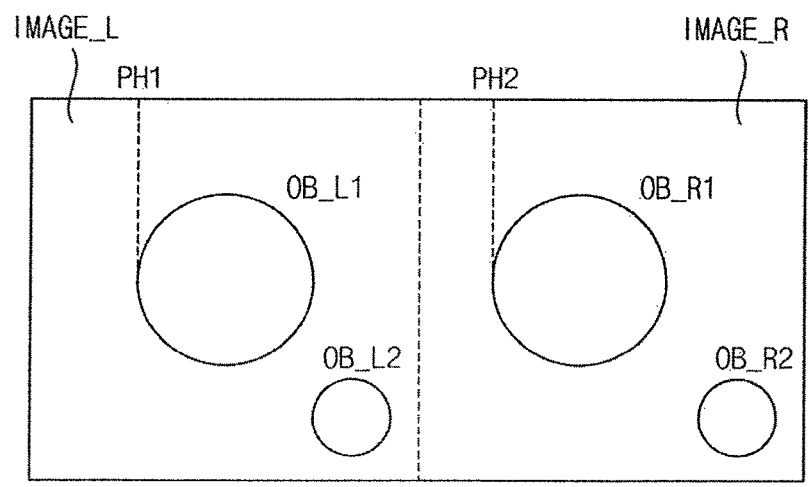
FIG. 12 illustrates a diagram of an example of an operation of the timing controller of FIG. 11.

FIG. 10 is a diagram illustrating a cross-section of the head mounted display device of FIG. 1 according to another embodiment. FIG. 11 is a block diagram illustrating an example of the timing controller included in the head mounted display device of FIG. 10. FIG. 12 is a diagram illustrating an example of an operation of the timing controller of FIG. 11.

Referring to FIGS. 1, 2, 7, and 10, the head mounted display device 100 may include a display panel 1010, a reflective panel 1020, and a lens 1030. The display panel 1010 may be similar to the display panel 110 described with reference to FIG. 2, and the reflective panel 1020 and the lens 1030 may be the same as or substantially the same as the reflective panel 120 and the lens 130 described with reference to FIG. 2, respectively. Therefore, duplicated description will not be repeated. However, as shown in FIG. 10, the reflective panel 1020 may be positioned at an angle β with respect to an imaginary line in parallel with a second display region 1012 offset therefrom by a distance L3, as described below, rather than at the intersection of first and second display regions as illustrated in FIG. 2.

The display panel 1010 may include a first display region 1011 (or a first display unit, a first sub display panel) and the second display region 1012 (or a second display unit, a second sub display panel). The second display region 1012 may be arranged with a first angle α with respect to the first display region 1011. For example, the display panel 1010 may be a foldable display panel as described with reference to FIG. 2.

A first optical path length L1 of the first display region 1011 (e.g., a distance from the first display region 1011 through the reflective panel 1020 to the lens 1030) may be different from a second optical path length L2 of the second display region 1012 (e.g., a distance from the second display region 1012 through the reflective panel 1020 to the lens 1030).

For example, the second optical path length L2 may be greater (or longer) than the first optical path length L1 by a third distance L3, e.g., the distance by which the reflective panel 1020 is offset from the second display region 1012, and may be smaller (or shorter) than a focal length of the lens. When the second optical path length L2 exceeds the focal length of the lens, an image of the second display region 1012 may not form on retina of the user.

In some example embodiments, pixel density (or pixel per inch; PPI) of the second display region 1012 (or a resolution of pixels included in the second display region 1012) may be lower than pixel density of the first display region 1011 (or a resolution of pixels included in the first display region 1011). For example, when the pixel density of the first display region 1011 is equal to the pixel density of the second display region 1012, a pixel of the second display region 1012 may be seen for the user to be smaller than a pixel of the first display region 1011 because the second optical path length L2 of the second display region 1012 is greater than the first optical path length L1 of the first display region 1011. Therefore, a pixel of the second display region 1012 may be seen for the user to have a size which is the same as a size of a pixel of the first display region 1011 when a real size of the pixel of the second display region 1012 is greater than a real size of the pixel of the first display region 1011.

In some example embodiments, a relationship between the pixel density of the second display region 1012 and the pixel density of the first display region 1011 may be represented as an Equation 1 below, $$PPI_2 = PPI_1 * L1/(L1+L3) \qquad \text{Equation 1}$$

where $PPI_2$ denotes the pixel density of the second display region 1012, $PPI_1$ denotes the pixel density of the first display region 1011, L1 denotes the first optical path length L1, and L3 denotes the third distance L3.

Referring to FIGS. 10 and 11, a timing controller 1140 (e.g., the timing controller 1040 described with reference to FIG. 7) may divide the input image data DATA1 into first sub data DATA_S (e.g., short distance image data) and second sub data DATA_L (e.g., long distance image data) based on a depth of an image corresponding to the input data DATA1. Here, the input image data DATA1 may include left image data (e.g., left-eye data, left-eye spatial data) and right image data (e.g., right-eye data, right-eye spatial data) as described with reference to FIG. 1. Here, a data driver (e.g., the data driver 730 described with reference to FIG. 7) may generate a first data signal based on the first sub data DATA_S and may provide the first data signal to the first display region 1011. In addition, the data driver 1143 may generate a second data signal based on the second sub data DATA_L and may provide the second data signal to the second display region 1012.

The timing controller 1140 may include an object extractor 1141, a position difference calculator 1142, and a data divider 1143. The object extractor 1141 may extract objects from the input image data DATA1. In an example embodiment, the object extractor 1141 may extract a first left object by detecting a closed loop in the left-eye data and may extract a first right object by detecting a closed loop in the right-eye data.

Referring to FIG. 12, a left image IMAGE_L may correspond to the left-eye data and a right image IMAGER may correspond to the right-eye data. The object extractor 1141 may detect objects, e.g., closed forms, here shown as circles, based on grayscale values included in the input image data DATA1 and a variation of the grayscale values. For example, the objects may include a first left object OB_L1, a first right object OB_R1, a second left object OB_L2, and a second right object OB_R2.

The position difference calculator 1142 may calculate a difference between locations (or positions) of first objects which correspond each other among the objects and may determine a depth of the first objects based on the difference. For example, the position difference calculator 1142 may calculate a first difference (or a first position difference) between the first left object OB_L1 and the first right object OB_R1. Similarly, the position difference calculator 1142 may calculate a second difference (or a second position difference) between the second left object OB_L2 and the second right object OB_R2.

In an example embodiment, the position difference calculator 1142 may calculate the difference based on a first horizontal position PH1 of the left object OB_L1 and a second horizontal position PH2 of the right object OB_R1. For example, the position difference calculator 1142 may calculate the difference based on first position information of a first grayscale value, which is located at a top left of the first left object OB_L1 (or at a top left of grayscale values included in the first left object OB_L1), and second position information of a second grayscale of the first right object OB_R1 which corresponds to the first grayscale value. For example, the position difference calculator 1142 may calculate the difference based on centers (or centers of areas) of objects, position information of grayscale values which are located at a top right (e.g., at a top right of the first objects OB_L1 and OB_R1), average of positions of grayscale values included in the first objects.

The position difference calculator 1142 may determine the depth (or a depth of the first objects) which corresponds to the difference based on a linear equation which represents a relation between the difference and the depth.

When the depth of the first objects is greater than a reference depth, the data divider 1143 may generate the first sub data DATA_S based on the first objects and may generate the second sub data DATA_L by cutting out the first sub data DATA_S from the input image data DATA1. For example, when the first objects OB_L1 and OB_R1 is located in a short distance (or with a short depth) with respect to a background image (or when the user determines that the first objects OB_L1 and OB_R1 is a short distance image), the data divider 1143 may generate a short distance image data including the first objects OB_L1 and OB_R1 and a long distance image data with exception of the short distance image data from the input image data DATA1.

A first sub image corresponding to the first sub data DATA_S may be displayed through the first display region 1011, and a second sub image corresponding to the second sub data DATA_L may be displayed through the second display region 1012. When the user looks at the second sub image provided from the second display region 1012, a lens of the user may change to be relatively thin similarly to when the user looks at a real object (or a real background) located at a long distance. Similarly, when the user looks at the first sub image provided from the first display region 1011, a lens of the user may change to be relatively thicker similarly to when the user looks at a real object (or a real background) located at a short distance. Therefore, fatigue of the user due to inconsistency between a depth of an image (or an object) and a thickness of the lens of the user may be reduced or eliminated.

Figure 13:
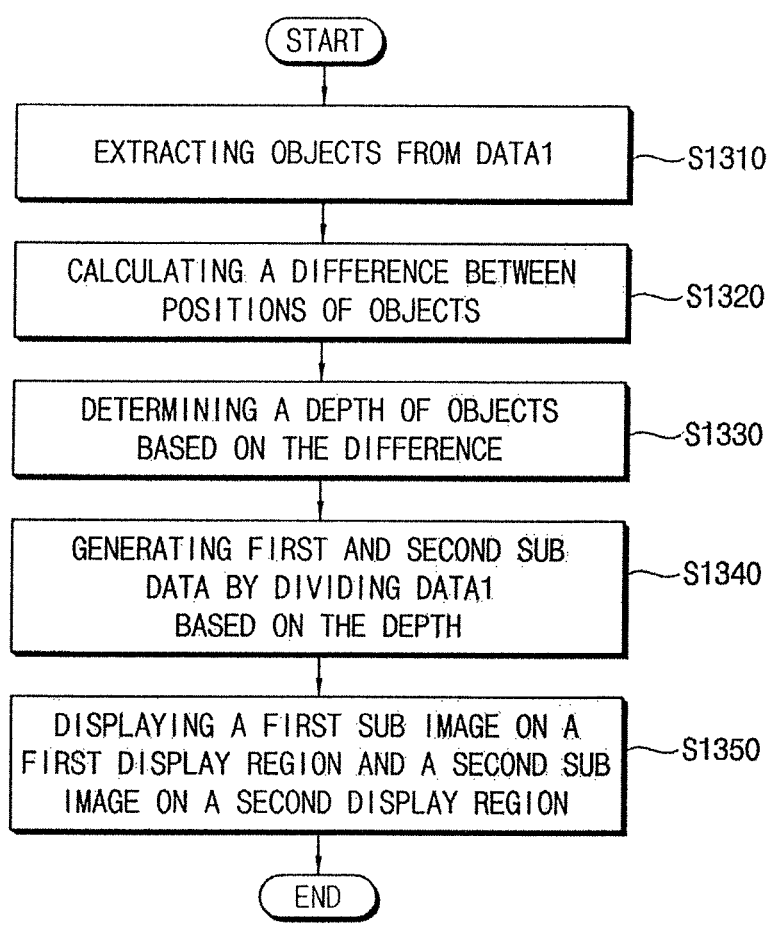
FIG. 13 illustrates a flow diagram of a method of driving a head mounted display device according to example embodiments.

FIG. 13 is a flow diagram illustrating a method of driving a head mounted display device according to example embodiments.

Referring to FIGS. 1, 10, and 13, the method of FIG. 13 may be performed by the head mounted display device of FIG. 10. That is, the method of FIG. 13 may be performed by the head mounted display device 100 which includes the lens 1030, the first display region 1011, and the second display region 1012, where the first display region 1011 and the second display region 1012 are located with different optical path lengths.

The method of FIG. 13 may extract objects from input image data DATA1 (S1310). As described with reference to FIGS. 11 and 12, the method of FIG. 13 may extract a first left object by detecting a closed loop in left-eye data and may extract a first right object by detecting a closed loop in right-eye data. For example, as described with reference to FIG. 12, the method of FIG. 13 may detect objects (or closed forms) based on grayscale values included in the input image data DATA1 and a variation of the grayscale values. For example, the objects may include a first left object OB_L1, a first right object OB_R1, a second left object OB_L2, and a second right object OB_R2.

The method of FIG. 13 may calculate a difference between locations (or positions) of first objects which correspond each other among the objects (S1320). As described with reference to FIGS. 11 and 12, the method of FIG. 13 may calculate the difference based on a first horizontal position PH1 of the left object OB_L1 and a second horizontal position PH2 of the right object OB_R1.

The method of FIG. 13 may determine a depth of the first objects based on the difference (S1330). For example, the method of FIG. 13 may determine the depth (or a depth of the first objects) corresponding to the difference based on a linear equation which represents a relation between the difference and the depth.

The method of FIG. 13 may generate first sub data DATA_S and second sub data DATA_L by dividing the input image data based on the depth of the first objects (S1340).

In some example embodiments, when the depth of the first objects is greater than a reference depth, the method of FIG. 13 may generate the first sub data DATA_S based on the first objects and may generate the second sub data DATA_L by cutting out the first sub data DATA_S from the input image data DATA1. For example, when the first objects OB_L1 and OB_R1 is located in a short distance (or with a short depth) with respect to a background image (or when the user determines that the first objects OB_L1 and OB_R1 is a short distance image), the method of FIG. 13 may generate a short distance image data including the first objects OB_L1 and OB_R1 and a long distance image data with exception of the short distance image data from the input image data DATA1.

The method of FIG. 13 may display a first sub image corresponding to the first sub data DATA_S using the first display region 1011 and may display a second sub image corresponding to the second sub data DATA_L using the second display region 1012 (S1350). Here, when the user looks at the second sub image provided from the second display region 1012, a lens of the user may change to be relatively thin similarly when the user looks at a real object (or, a real background) located at a long distance. Similarly, when the user looks at the first sub image provided from the first display region 1011, a lens of the user may change to be relatively thicker (or changed to be relatively thick) similarly to when the user looks at a real object (or, a real background) located at a short distance. Therefore, a fatigue of the user due to inconsistency between a depth of an image (or an object) and a thickness of the lens of the user may be reduced or eliminated.

As described with reference to FIG. 13, the method of driving a head mounted display device according to example embodiments may drive the head mounted display device including the first display region 1011 and the second display region 1012 which are located with different distances and may display a short distance image using the first display region 1011 and a long distance image using the second display region 1012. Therefore, a fatigue of the user due to inconsistency between a depth of an image (or an object) and a thickness of the lens of the user may be reduced or may be eliminated.

Embodiments may be applied to any display device (e.g., an organic light emitting display device, a liquid crystal display device, etc.). For example, embodiments may be applied to a head mounted display (HMD), a television, a computer monitor, a laptop, a digital camera, a cellular phone, a smart phone, a personal digital assistant (PDA), a portable multimedia player (PMP), an MP3 player, a navigation system, a video phone, etc.

Some example embodiments provide a head mounted display device of which a pixel is invisible to a user. Some example embodiments provide a head mounted display device to relieve a fatigue of a user. Some example embodiments provide a method of driving a head mounted display device. By using a first display region, a second display region, and a reflective panel, and mixing (or grafting) a first transmitted image of the first display region and a second reflected image of the second display region using the reflective panel, some embodiments may provide a display having an increased resolution. By providing the first and second display regions having a same pixel arrangement (or for a foldable display panel) by inverting only the second reflected image of the second display region using the reflective panel, some embodiments may provide increased resolution without an alignment process. By including a first display region and a second display region having different optical path lengths to a lens, e.g., by display a shorter optical path length image using the first display region and a longer optical path length image using the second display region, some embodiments may eliminate or reduce fatigue due to inconsistency between a depth of an image (or an object) and a thickness of the lens of the eyes of the user. Some example embodiments provide a method of driving a head mounted display panel by efficiently by dividing a short distance image and a long distance image based on a depth of an object.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims.

What is claimed is:

1. A head mounted display device, comprising:
   a display panel including a first display region and a second display region arranged at a first angle with respect to the first display region;
   a reflective panel arranged with a second angle with respect to the second display region, the reflective panel to output a first transmitted light by transmitting a first light output from the first display region, and to output a second reflected light by reflecting a second light output from the second display region; and
   a lens to collect the first transmitted light and the second reflected light.

2. The head mounted display device as claimed in claim 1, wherein:
   the first angle is 90 degrees, and
   the second angle is 45 degrees.

3. The head mounted display device as claimed in claim 1, wherein the display panel is a foldable display panel.

4. The head mounted display device as claimed in claim 1, wherein each of the first display region and the second display region includes pixels which are arranged in a PenTile form.

5. The head mounted display device as claimed in claim 4, wherein:
a pixel arrangement of the first display region is the same as a pixel arrangement of the second display region, and
the first transmitted light is compensated by the second reflected light.

6. The head mounted display device as claimed in claim 1, wherein each of the first display region and the second display region includes pixels which are arranged in a stripe form.

7. The head mounted display device as claimed in claim 1, further comprising:
a timing controller to output converted data by processing input image data;
a data driver to generate a data signal based on the converted data and to provide the data signal to the display panel; and
a scan driver to provide a scan signal to the display panel.

8. The head mounted display device as claimed in claim 7, wherein the timing controller divides the input image data into first sub data corresponding to the first display region and second sub data corresponding to the second display region and generates sub data by inverting the second sub data in a first direction.

9. The head mounted display device as claimed in claim 8, wherein:
the data driver is to sequentially provide the display panel with a first data signal corresponding to the first sub data and a second data signal to the second sub data, and
the scan driver is to provide the scan signal to the display panel along the first direction.

10. The head mounted display device as claimed in claim 7, wherein the timing controller is to divide the input image data into first sub data corresponding to the first display region and second sub data corresponding to the second display region.

11. The head mounted display device as claimed in claim 10, wherein:
the data driver is to provide a first data signal corresponding to the first sub data to the first display region and provide a second data signal corresponding to the second sub data to the second display region, and
the scan driver is to provide the scan signal to the first display region along a first direction and provide the scan signal to the second display region along a second direction, opposite the first direction.

12. The head mounted display device as claimed in claim 10, wherein the timing controller is to respectively render the first sub data and the second sub data using a rendering filter according to a pixel arrangement of the first display region and a pixel arrangement of the second display region.

13. The head mounted display device as claimed in claim 1, wherein a first optical path length between the first display region through the reflection panel to the lens is different from a second optical path length between the second display region through the reflection panel to the lens.

14. The head mounted display device as claimed in claim 13, wherein the second optical path length is longer than the first optical path length and is shorter than a focal length of the lens.

15. The head mounted display device as claimed in claim 14, wherein a resolution of second pixels included in the second display region is lower than a resolution of first pixels included in the first display region.

16. The head mounted display device as claimed in claim 14, further comprising:
a timing controller to generate first sub data and second sub data by dividing input image data based on a depth of an image corresponding to the input image data; and
a data driver to generate a first data signal based on the first sub data, to provide the first data signal to the first display region, to generate a second data signal based on the second sub data, and to provide the second data signal to the second display region.

17. The head mounted display device as claimed in claim 16, wherein the timing controller is to extract objects from the input image data, calculate a difference between locations of first objects which correspond each other among the objects, and determine a depth of the first objects based on the difference.

18. The head mounted display device as claimed in claim 17, wherein:
the input image data includes left-eye data and right-eye data, and
the timing controller is to extract a first left object by detecting a closed loop in the left-eye data, extract a first right object by detecting a closed loop in the right-eye data, and calculate a difference based on a first horizontal location of the first left object and a second horizontal location of the first right object.

19. The head mounted display device as claimed in claim 17, wherein the timing controller is to generate the first sub data based on the first objects of the input image data when the depth of the first objects is greater than a reference depth and generate the second sub data by cutting the first sub data from the input image data.

20. A method of driving a head mounted display device including a lens, a first display region, and a second display region arranged at a first angle with respect to the first display region, the first and second display regions have different optical path lengths to the lens, the method comprising:
extracting objects from input image data;
calculating a difference between locations of first objects which corresponds each other among the objects;
determining a depth of the first objects based on the difference;
generating first sub data and second sub data by dividing the input image data based on the depth of the first objects; and
displaying a first sub image corresponding to the first sub data using the first display region and a second sub image corresponding to the second sub data using the second display region, respectively.

* * * * *